United States Patent Office 3,573,229
Patented Mar. 30, 1971

3,573,229
CERMET RESISTOR COMPOSITION AND METHOD OF MAKING SAME
Darwyn L. Herbst, Smithtown, and William L. Dawson, East Setauket, N.Y., assignors to Alloys Unlimited, Inc., Melville, N.Y.
Filed Jan. 30, 1968, Ser. No. 701,611
Int. Cl. H01b 1/02; B44d 1/02
U.S. Cl. 252—514                        17 Claims

ABSTRACT OF THE DISCLOSURE

The field of cermet resistors is reviewed, problems associated therewith are discussed, and the efforts of certain prior workers are summarized. An improved resistance composition is described employing, as the conductive fraction, a mixture of gold, silver or platinum with the oxide of iridium or ruthenium. Resistors are produced having excellent noise, TCR and other properties at resistances of up to 10 megohms per square, and in no instance is frit content higher than about 78%. The method of producing these resistors in a readily reproducible manner is detailed, and their properties are illustrated.

BACKGROUND OF THE INVENTION

(1) Field of the invention

This invention relates generally to cermet resistors and, more particularly, to a novel, improved cermet resistance composition, how it is prepared and how resistors are produced therefrom. A proper understanding of the invention demands that the complexity and problems associated with glassy materials be appreciated, in addition to the specific problems associated with cermet resistor development.

It has been suggested that glasses are the next best thing to a universal solvent. Practically all elements can, in fact, be dissolved in glasses to some degree; moreover, oxidation, reduction, precipitation, decomposition, dissolution and ion exchange reactions can all be carried out inside glasses, and any such reaction can be halted at any desired point. In spite of all these desirable properties, however, little is known about amorphous systems in general and/or glasses in particular. This is due in large measure to their extreme complexity, at least when compared to crystalline systems. Even in metallic systems, present knowledge of ternary and quaternary alloys is limited. Since even simple glass systems may contain four or more ingredients, it is manifest that detailed structural knowledge thereof is beyond the present state of the art.

Lack of knowledge of structure has not deterred prior workers from formulating complex glasses and measuring their properties, but this has been done largely on an empirical basis. This is particularly true in the formulation of glassy compositions for use as electrical resistors.

Glass has been used as an electrical insulator for many years and it is only recently, relatively speaking, that it was determined that the addition of conductive elements thereto, evenly distributed in the glass matrix, could impart to the glass a finite conductivity (inversely, a finite resistivity).

Since glass powders or frits could be dispersed in a carrier also containing a dispersed phase conductor, it became possible to apply a measurable quantity of this dispersion to a substrate, fire it and, theoretically at least, obtain a resistor having a predictable resistance. Such resistors are referred to as cermet resistors or thick film resistors. These resistor structures are particularly desirable for use in potentiometers or other variable resistance devices, because of the poor wearing qualities and/or expense of previous types. The need for cermet resistors has expanded along with the commercial, industrial and military use of electronics generally, and they are found both as discrete components and as part of hybrid modules.

Materials currently employed for these resistors are discussed below, but prior thereto, the problems which prior art devices are generally subject to should be understood.

Considering the practical difficulty (if not impossibility) of laying down a dispersion of conductive and non-conductive elements that is exactly even in both depth and concentration, it is not unreasonable to assume that the biggest problems would occur where either very high or very low resistivities are desired. This is in fact the case. In other words, it is most difficult to control the process of electronic conduction in glassy structures at either very high or very low concentrations of conductive elements.

It has been determined that, practically, very stringent firing conditions are necessary to produce resistors of a consistent value. This problem increases at high and low values and, in fact, reproducibility has been satisfactory only in the intermediate resistance range of about 200 ohms per square ($\Omega/\square$) to about 8000 $\Omega/\square$. Considering the ease with which redox and other reactions can be carried out in glasses, and the inevitable presence of a high proportion of oxygen in such systems, this is not really surprising.

There are special problems associated with these structures in variable resistors. Again, the best products are in the intermediate resistance range; low ohm per square materials tend to be low in abrasion resistance, and high resistance materials tend to be either too irregular or too low in metal content for good (sliding) contact. Further, resistors containing any bubbles or surface irregularities tend to be unstable under load.

To achieve a resistance of greater than about 10K $\Omega/\square$, the prior art teaches that the frit content of the film must be at least 90%. Resistors of such high glass content tend to have high distributive capacitances, which is detrimental from a frequency standpoint. They may also establish a high charge buildup under load and become unstable. Instability of these resistors is also associated with the aforementioned surface irregularities. Lastly, in high ohm per square materials, the noise levels tend to be high.

Most prior workers have preferred gold-platinum or like materials as contact pads and conductors. Silver or high silver alloys, which would be useful in many commercial applications because of its attractive price, has not been used because of detrimental junction interactions with many thick film resistance compositions.

(2) Prior art

It is neither necessary nor desirable to review the prior art in its entirety in order to understand the present invention. However, selected prior art patents are discussed below, emphasizing the most popular materials and systems used by prior workers.

Prior to development of suitable metal powder producing techniques, intentionally reactive systems were employed, wherein the conductive metal was produced in situ. Resinates were the most widely used compounds, a metal, palladium or platinum was applied to a substrate as a resinate, and the organic moiety driven off by firing. Typical of these metal film resistor teachings are the 1942 patent of Jira, No. 2,281,843, and the 1947 British Pat. No. 625,198.

The 1960 patent of Place et al. is considered an important one. Broadly, they teach a resistance composition of 84–98% ceramic glass, 1–15% of a noble metal and 1–3% of complex metal oxide semiconductor (all percentages are by weight unless otherwise indicated). As noble metals, they use gold, platinum, palladium, rhodium and silver, usually in mixture. The oxide semiconductors are added to reduce contact resistance (particularly to sliding contacts), and include a variety of stannates and antimonates. The patentees also prefer to add about 1% of a ceramic flux such as bismuth, vanadium or molybdenum oxide, to improve glass-metal adhesion. Lead borosilicate glasses are preferred. D'Andrea's 1960 patent, No. 2,924,540, copending with Place et al., is similar. He specifies 8–50% palladium or palladium plus silver, the remainder glass. He notes that $Bi_2O_3$ will raise the resistance.

Four recent patents are of interest. Bruhl et al., No. 3,326,720, claim higher resistances with an iridium-gold alloy, the ratio therebetween varying from 3:1 to 10:1. They employ 16 to 50% of this alloy, remainder glass, and report 9K $\Omega/\square$ at 80% glass. Vickery's 1967 patent, No. 3,343,985, notes that Place et al's. earlier teachings did not yield reproducible results, and suggests that the temperature coefficient of resistance (hereafter, TCR) varies with the viscosity of the glass. Further, he claims that reproducibility of resistance demands careful particle size control, and he specifies a mean diameter of $50\mu$ with a dispersion of less than 25%.

Dumesnil, Pat. No. 3,052,573, showed that many problems which D'Andrea had encountered, particularly fluctuation of resistance with firing temperature, could be lessened by using palladium oxide in place of the pure metals used by D'Andrea. Dumesnil is of interest because the conductive fraction of his preferred composition is 4–15% PdO, 0–12% silver, gold or platinum, and 73 to 92% frit. However, the real improvement in reproducibility only comes when the PdO is mixed with about 10% of an oxide selected from the following group: Zr, Al, Ca, Sn, Mg, Zn and rare earth metal oxides. Dumesnil reports achieving resistances up to 26K $\Omega/\square$, the latter with 62% frit, 17% Ag, 18% PdO, and 3% $Al_2O_3$ fired at 1100° F. for 60 minutes. Dumesnil states that the PdO can be wholly or partially replaced with RhO, but no data is given. Rhodium in any form is extremely expensive and difficult to obtain. The suggested equivalence is at least open to question, since palladium has a cubic structure and rhodium is hexagonal, and the existence of the monoxide (RhO) has been questioned.

The recent patent of Faber et al., No. 3,304,199 is also of interest. These workers specify oxides of ruthenium or iridium as their only conductive fraction and report achieving a resistance of 180K $\Omega/\square$ with 95.5% frit and 4.5% $IrO_2$. Insofar as is known, this is the highest resistance reported by prior workers. Of course, problems inherent at such high frit contents would be expected. Faber et al. also report a maximum TCR of 100 p.p.m./° C.

Objects of the invention

It is a general object of the present invention to provide an improved resistance composition for cermet resistors and the like, and a method therefor.

Another object of the invention is to provide resistance materials and resistors having a higher metal content at higher resistivities than materials heretofore available.

Still another object of the invention is to provide cermet resistance materials and resistors having reproducibly higher resistivities than prior art materials were capable of achieving.

Yet another object of the invention is to provide cermet resistance materials and resistors which can be terminated with high-silver content conductives.

A further object of the invention is to provide cermet resistors having a more homogeneous appearance and improved surface qualities, usable as variable resistors over a wide range of resistances.

A still further object of the invention is to provide cermet resistor compositions and resistors with much improved noise levels.

Yet another object of the invention is to provide cermet resistor materials capable of producing resistors having closer tolerances than materials heretofore available.

A still further object of the invention is to provide a method of making resistance compositions and resistors which carry out all of the foregoing objects.

Various other objects and advantages of the invention will become clear from the following detailed description of several embodiments thereof, and the novel features will be particularly pointed out in connection with the appended claims.

SUMMARY OF THE INVENTION

In essence, the present invention is based, at least in part, on the discovery that very high resistances can be obtained without using correspondingly high percentages of frit by employing, as the conductive fraction of the composition, a powder mixture defined by the general formula:

$$M_x + O_y$$

where M is gold, silver, platinum or mixtures thereof (but not, significantly, palladium), O is the oxide of ruthenium, iridium, or mixtures thereof, and $x$ and $y$ define the weight ratio between M and O, both generally falling within the range 0.2 to 0.8. This mixture comprises from 20 to 70% of the composition. The remainder of the composition is a glass frit to which may be added a small portion of a non-glass forming oxide from Group $3b$ or $4b$ of the Periodic Table ($ZrO_2$, $TiO_2$, etc.). The latter component is particularly desirable at frit concentrations of greater than about 40%. In accordance with the invention, resistances as high as 10 megohms per square (10M $\Omega/\square$) can be reliably produced with good noise levels and TCR characteristics. The resistances of the invention can be terminated to conventional Pt/Au, Pd/Au and Pd/Ag conductives and also to high silver conductives.

The method of the invention comprises the mixing and blending steps used by prior workers, with certain refinements in the dispersion of the powders, depositing material to close tolerances, and firing of the deposited layer under specified conditions.

DESCRIPTION OF EMBODIMENTS

Figure 2:
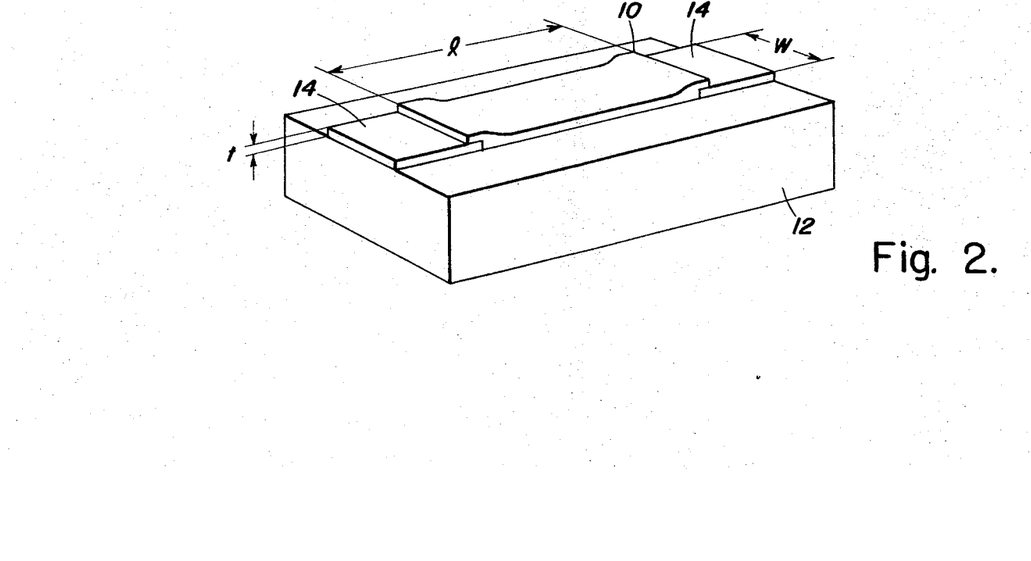
FIG. 2 is a perspective view, much enlarged, of a resistor fired onto a substrate.

Prior to discussing the invention in detail, it is necessary that certain terms be defined with precision. In FIG. 2 there is shown a cermet resistor 10 applied on and fired so as to adhere to a suitable high temperature dielectric substrate 12 between conductives 14. Common substrate materials are alumina (glazed or unglazed), barium titanate, various ceramics and the like. For very sophisticated applications, such exotic materials as cleaved mica, quartz, sapphire or ruby may be employed. The choice of substrate material can affect the resistor; all work reported herein was done on unglazed alumina substrates.

As shown in FIG. 2, resistor 10 has a length $l$, width $w$ and thickness $t$. The resistance of such a resistor is determined to the first approximation by the formula:

$$R = \frac{\rho l}{tw} \quad (1)$$

where $\rho$, the resistivity of the material is a variable, dependent on composition and processing parameters. The term "ohms per square" has been used hereinabove, and is in common usage by workers in the field, rather than resistivity. This expression is derived from Equation 1 by noting that $l/w$ is equal to the number of geometric squares in a given pattern, and $t$ can be assumed to be a constant C, so:

$$R = \frac{\rho}{t} \cdot \frac{l}{w} = \frac{\rho}{C} \text{ (no. of squares)} \quad (2)$$

so that $$\rho = \frac{CR}{\text{(no. of squares)}} \quad (3)$$

and $$\rho \sim \frac{R}{\text{(no. of squares)}} \quad (4)$$

It is very clear, of course, that one cannot properly speak of resistivity in terms of ohms per square without specifying film thickness. Faber et al. note that "sheet resistance" in ohms per square was for a 0.001 in. film, but other workers have generally not specified film thickness. The prior art is generally devoid of teachings on how uniform film thickness is obtained.

Figure 1:
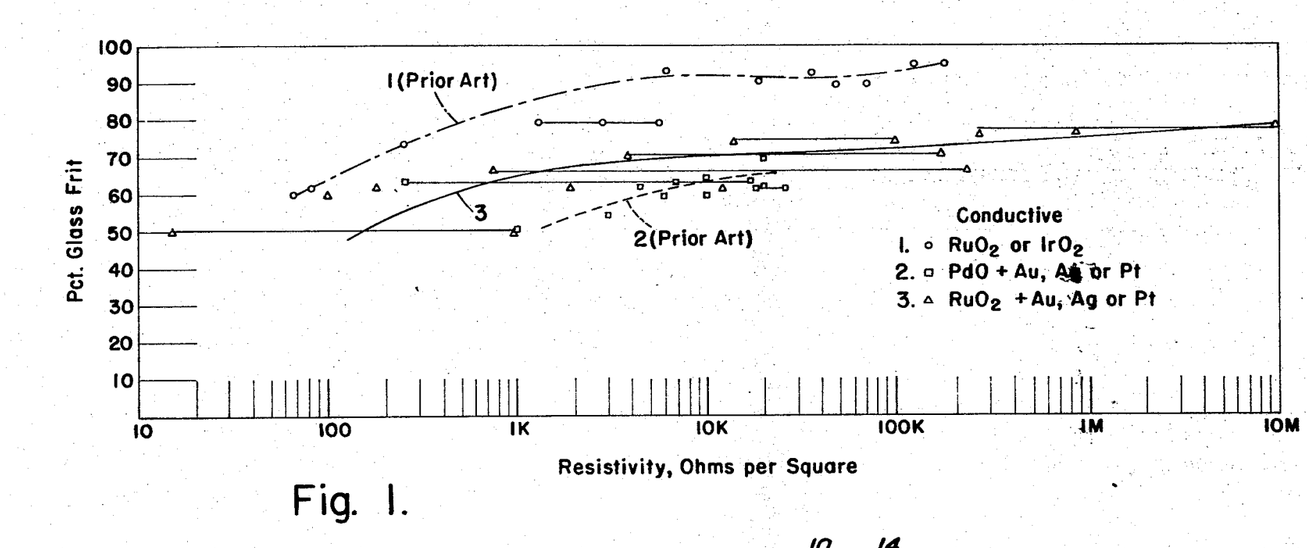
FIG. 1 is a plot of percentage frit vs. resistivity for three types of cermet resistor compositions.

As noted hereinabove, the essence of the present invention resides in the combination of the conductors silver, gold or platinum, with the oxides of ruthenium or iridium, as the conductive portion of the resistance composition. That this provides results that are quite surprising can be seen from FIG. 1, and attention is directed thereto. FIG. 1 is a plot of percent frit in a resistance composition vs. resistivity achieved. Curve 1 is a plot of the results reported by Faber et al. using ruthenium and iridium oxides only as the conductive fraction for 0.001 in. films. It should be pointed out that the data points and the spread of resistivities obtained at a given frit concentration (horizontal lines) are really more significant than the curve which has been drawn therethrough. As can be seen, these workers report a high resistivity of about 180K Ω/☐ at at 95% frit.

Curve 2 of FIG. 1 is a plot of the results of Dumesnil. He states that films of 15–25 microns are satisfactory and it is presumed that his films are in this range. Since $25\mu \cong 0.001$ in., his results are believed to be comparable with those shown in curve 1. This work, wherein PdO and Au, Ag or Pt constituted the conductive fraction, used a much narrower range of frit concentration, 50–70%, with most results reported at about 64%, and resistivities varied in the range of 1 to 10K Ω/☐.

Curve 3 illustrates results of the present invention. This same data is plotted in more detail in FIG. 5 and is discussed hereinbelow. The thickness of these films was about 0.6 to 0.8 mil, or about 15 to 20μ, and are so comparable with the other curves. The first point of interest is that these compositions combine the oxides used in curve 1 with the noble metals used in curve 2. Rather than being similar in slope and intermediate curves 1 and 2, however, curve 3 shows resistivities extending from 10 to 10M Ω/☐ within the relatively narrow frit concentration range of about 50 to 75%. Truly, these are most surprising results. Moreover, the actual curve of curve 3 is of less significance than the broad range resistivities that are obtained at a given level of frit concentration (i.e. the horizontal lines). This is achieved by varying the values of $x$ and $y$ in the general formula $M_x + O_y$ in the mixture, as discussed more fully hereinbelow.

It is significant to note that while PdO is used by Dumesnil and use of Pd is taught by many of the prior workers, this element is not employed in either form in the composition of the present invention. Dumesnil notes that both Pd and PdO will react with vitreous enamel more or less at varying temperatures and, to reduce such reaction, specifies the various other oxide additives to his composition. It is known that the reaction is reversible at temperatures of the order of 700° C., particularly in the presence of silver, whereas the corresponding reaction with ruthenium is not reversible, even at temperatures as high as 900° C. It would thus appear that the system Pd-PdO is thermodynamically unstable at glass firing temperatures (i.e. around 700° C.) and, while the additives specified by Dumesnil may tend to block or slow down such reactions, they clearly do not stop them (he reports two fold changes in resistance, with the additives, when firing for 30 and 90 minutes). Moreover, it has been determined that the low-value resistances with a conductive fraction of Pd-Ag or PdO-Ag can be detrimentally effected by soft solders, i.e., the resistor accepts the solder, causing a significant resistance change. Contrary to this, $RuO_2$+Ag is solder resistant and can thus be immersed in solder without undesirable resistance changes. For these reasons, as well as the obvious limits suggested by curve 2 of FIG. 1, the present invention does not employ Pd or PdO.

As noted hereinabove, the present invention contemplates certain oxide additives in addition to the $M_x + O_y$ and frit mixture. Whereas Dumesnil, for example, specifies seven metal oxides and all of the rare earth oxides (most of which are glass formers) as additives to increase PdO stability, the present invention employes only non-glass forming oxides, for a much different reason. These include $ZrO_2$, $HfO_2$, $TiO_2$ and $La_2O_3$. It is believed to be a safe presumption that the oxides of yttrium and scandium would behave in a similar manner and the usable oxide additives are thus defined as non-glass forming metal oxides from Groups 3b and 4b of the Periodic Table.

These oxides are useful to help maintain resistor shape, particularly at frit contents above 40%, and they also eliminate "bleed out" of resistance material into the conductives, thereby improving solderability near resistance-conductive overlays. If the oxides were glass formers, they would not generally have these beneficial effects. Although some benefit could be achieved by addition of $Al_2O_3$, $SiO_2$ etc., it would be at the cost of raising the glass viscosity significantly. This can result in an underfired, unstable resistance.

With the foregoing general considerations in mind, the method of producing resistance compositions and resistors in accordance with the invention will now be described. Thereafter, the properties and resistors produced by the method will be illustrated.

In common with most prior art procedures, the first step in preparing the composition is to blend the dry ingredients. Naturally, a glass powder flowable at the intended firing temperature, and having other properties suitable for resistance uses, must be chosen. Lead borosilicate glass frits are preferred by prior workers and in the instant invention. Two satisfactory grades are Nos. N-862 and Z-997 of the Harshaw Chemical Co. The frit, including any added non-glass forming oxide, should have a particle size in the 0.5 to 5μ range (and should be milled to this size if it does not) to allow for its uniform dispersion. The metal powder, either purchased or prepared by standard precipitation techniques, should have a particle size range of about 0.5 to 3μ. The size range of the conducting oxides is not critical, due to their friable nature; they will be reduced to —5μ during the process in any event.

The preferred proportion of ingredients, and the effects of variations thereof, are discussed in detail below. In general, however, the conductive fraction $M_x + O_y$ amounts to 20 to 70% of the composition, with $x$ and $y$ varying (inversely) between 0.20 and 0.80. Silver and ruthenium oxide are the preferred materials for the obvious reason of price.

Very pure ruthenium dioxide analyzes 75.98% Ru. It has been determined that this material hydrates readily, however, and the compound $RuO_2 \cdot 3 \cdot 5H_2O$ will analyze about 52% Ru. It has been further determined that the best results are obtained when a hydrated, or partially hydrated, form of the dioxide is used. In particular, the ruthenium content should be in the range of 52 to 74%. Expressed differently, material of the formula $RuO_2 \cdot zH_2O$ should be used, where $z$ is in the range of about 0.1 to 3.5. In certain applications, however, the anhydride is preferred (i.e., $z=0$). The superior results achieved with this material support the proposition that the hydrate is present in the fired resistor structure, although this is not known. The effect of varying amounts of hydration on resistivity is discussed below in connection with FIG. 8.

Up to 30% of the frit may be one of the non-glass forming oxides, but 10–20% is preferred. The frit, including added oxides, comprises from 30 to 80% of the resistance composition; most of the compositions have from 50 to 75% frit. The frit and added non-glass forming oxide content never exceeds 80%.

Blending of the dry powders is not a critical step. Combination thereof in a dry jar mill and rolling for 2–10 hrs., depending on batch size, is adequate.

A suitable carrier is then added to the powders. This step does not differ from prior art practices, and the choice of carriers is well known. For example, B-terpinol, butyl-carbitol acetate or pine oil may be employed. A thickener is used to impart the desired viscosity. Ethyl cellulose or other of the various thickeners on the market are satisfactory. Usually less than 2% of thickener is required. As is well known, the carrier-to-powder ratio effects the film thickness.

The prior art teaches that the mixture is, at this point, ready to be screened or otherwise applied onto the substrate. This is not felt to be true. During mixing with the organic vehicle, agglomerates inevitably form which will not break up under even violent mixing. As a result, it is necessary to perform a further milling or dispersion step. This also insures that all particles are minus $5\mu$. Milling is carried out on a three-roll dispersion mill until this size is reached, as determined by a fineness of grind gage, and the finished paste has a completely homogenous appearance. This step is considered essential for producing resistors of predictable properties and close tolerances.

Printing techniques of course must be varied with the thickness of film desired, and firing times and temperatures vary with the frit employed. The prior art is generally vague on this point (i.e. "fire at 500 to 1000° C. for a time sufficient to fuse the glass particles into a glass matrix"). This is dangerous, since the resistance of the unit may vary 20 to 40 fold as a result of a 200° C. difference in firing temperature (as reported by Dumesnil).

Figures 3, 4:
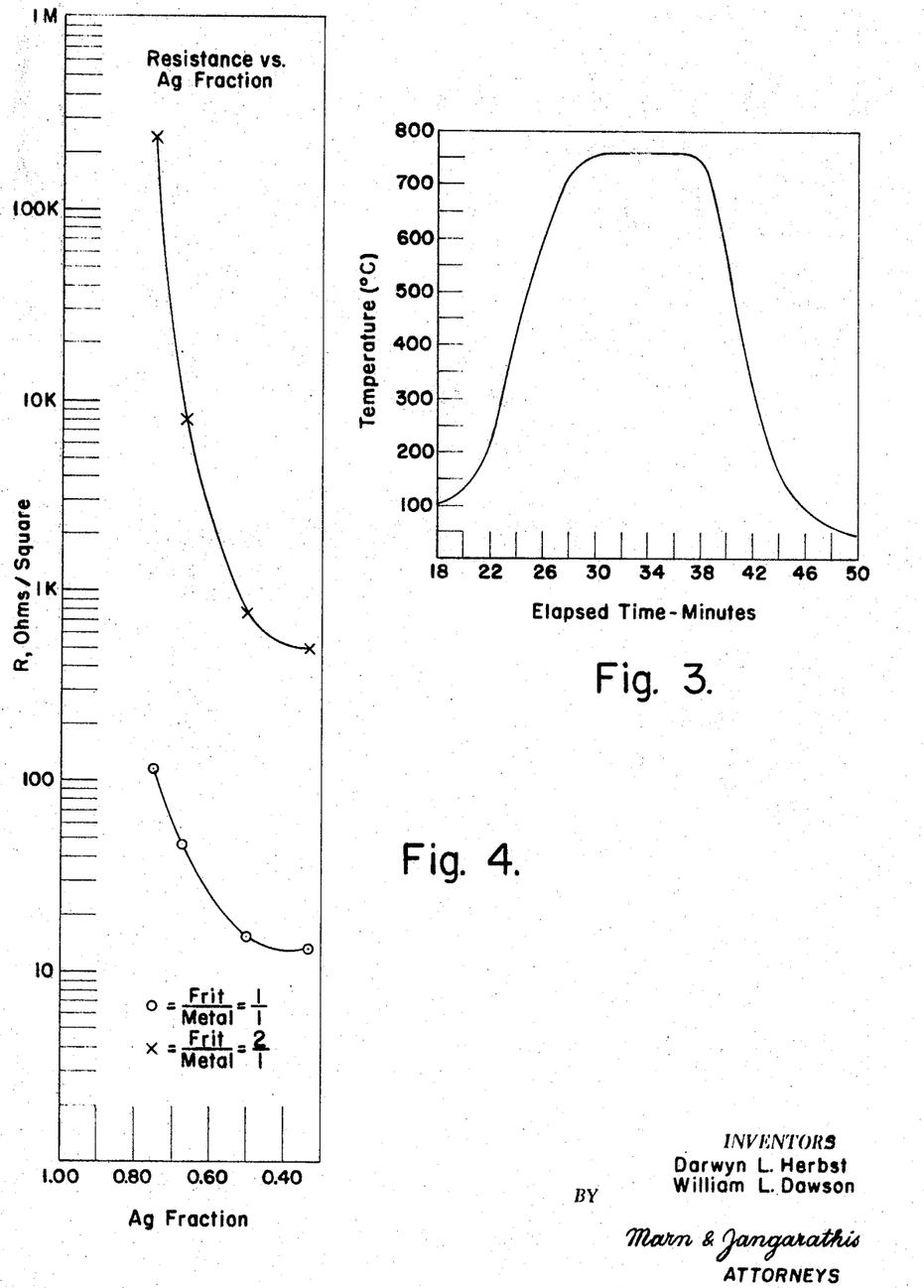
FIG. 3 is a time-temperature profile illustrating a typical firing cycle in accordance with the invention.
FIG. 4 is a plot of resistivity vs. fraction of silver in the conductive for two compositions of the invention.

In the results reported herein, the average film thickness was 0.6–0.8 mil. This was achieved with a 35% carrier concentration and screening through a 165 mesh screen with an emulsion thickness of 0.0006 in. Drying occurs in the first stages of the furnace. Firing was carried out in a belt furnace in an oxidizing atmosphere. The time-temperature profile of firing is shown in FIG. 3. While it is to be understood that other practices than those outlined above are within the scope of the invention, these parameters must all be controlled within close limits if any sort of reproducibility is to be achieved.

The properties of resistors produced in accordance with the foregoing teachings will now be considered.

FIG. 4 is a plot of resistivity vs. the value of $x$ in $Ag_{(x)} + RuO_{2(y)}$ for two compositions, one with total frit concentration at 50% and the other at 66.7%. Two things are immediately obvious: First, the increase of frit content uniformly increases resistivity by a factor of about $10^2$. Secondly, an increase in the ratio of silver to the oxide of from 0.33 to 0.75 (i.e. from $Ag_{.33} RuO_{2(.67)}$ to $Ag_{.75} RuO_{2(.25)}$) produces an increase of resistance of about a single order of magnitude at the low frit content, and about 500 fold increase at the 2:1 glass-metal ratio.

Figures 5, 6:
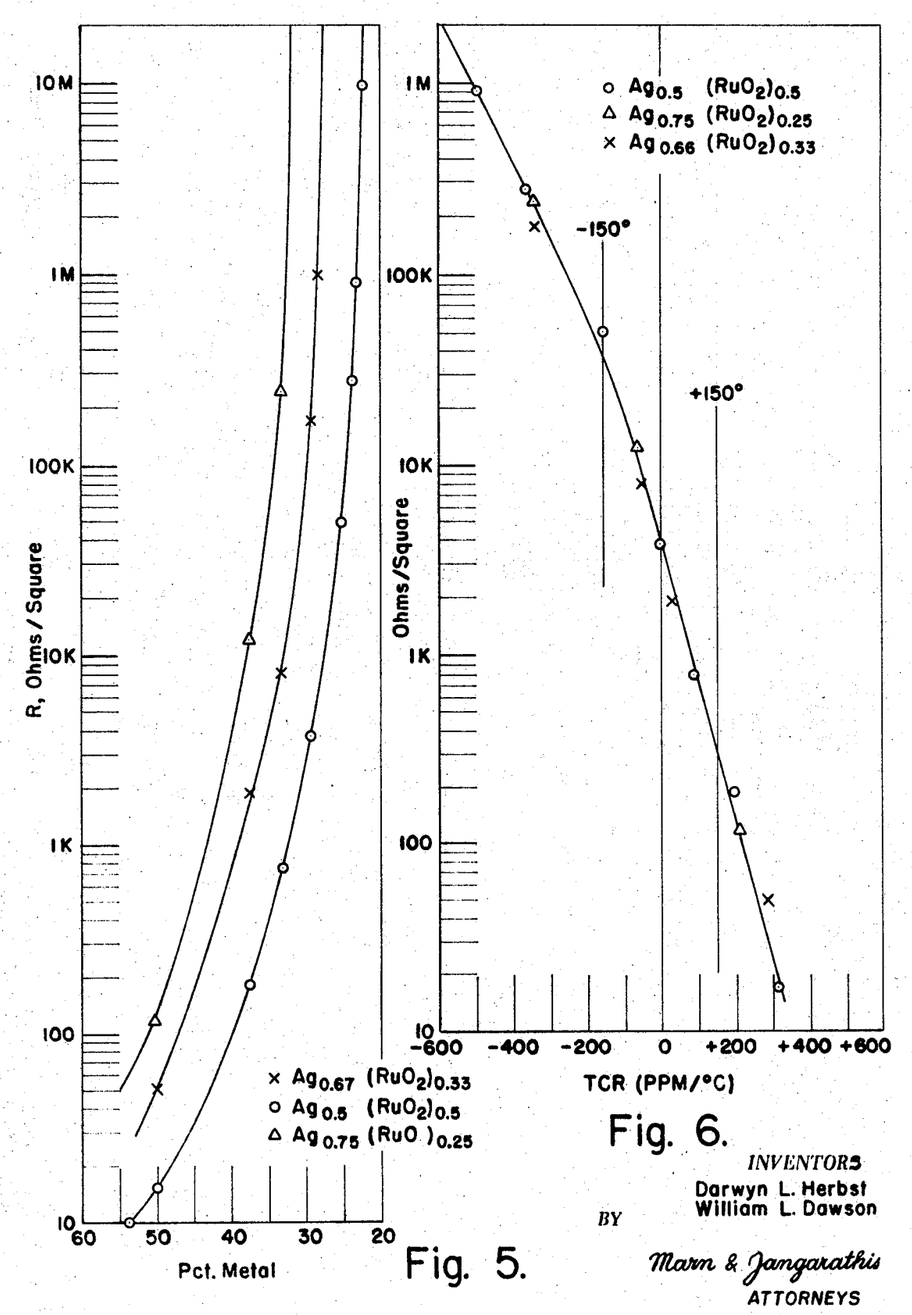
FIG. 5 is a plot of resistivity vs. percentage conductive for three levels of silver to ruthenium oxide content.
FIG. 6 is a plot of resistivity vs. temperature coefficient of resistance for three levels of silver to ruthenium oxide content.

FIG. 5 is a detailed plot of resistivity vs. percent conductive (i.e. M+O) for three $x-y$ ratios. This data is the same as that used for curve 3 of FIG. 1. In this instance, $x$ is varied from 0.5 to 0.75 and $y$ varies (inversely) from 0.25 to 0.5. On this semilog plot, the dramatic increase of resistivity into the megohm range as total conductive (M+O) drops from 50 to 25% is clearly evident. The similarity of slope between the three curves is also important, indicating that $x$ and $y$ can be varied, as well as the total frit content, with completely predictable results.

It was noted above that the non-glass forming oxides were useful for obtaining close tolerances and preventing bleed-out into the soldered terminations. These oxides also affect resistivity, TCR and noise levels of finished resistors. To quantify the foregoing, tests were made with $Ag_{(0.5)} RuO_{2(0.5)}$ as the conductive fraction and $ZrO_2$ varying from 10 to 30% of the frit. Results are set forth in Table I.

TABLE I.—EFFECT OF $ZrO_2$

| Percent $ZrO_2$ in frit | R, $\Omega/\square$ | TCR, ppm/° C. | Noise, db |
|---|---|---|---|
| 10 | 14K | −260 | −14 |
| 15 | 50K | −150 | +2 |
| 20 | 100K | −300 | +2 |
| 30 | >100M | | |

The very sharp increase in resistance caused by the $ZrO_2$ makes addition thereof in the 10–20% range preferred.

While the most surprising aspect of the present invention is undoubtedly the ability of these compositions to achieve resistivities in the megohm range at frit contents of less than 80%, resistors in the low and intermediate ranges exhibit excellent properties. Table II below lists properties for resistors having conductive fractions of other than $Ag_x(RuO_2)_y$.

TABLE II

| Composition | Percent conductive | R, $\Omega/\square$ | TCR, p.p.m./° C. | Noise, db |
|---|---|---|---|---|
| $Ag_{0.5}(IrO_2)_{0.5}$ | 50 | 1,000 | +200 | −12 |
| $Au_{0.5}(RuO_2)_{0.5}$ | 50 | 40 | +195 | <−35 |
| $Pt_{0.5}(RuO_2)_{0.5}$ | 50 | 35 | +270 | <−35 |
| $Ag_{0.25}Pt_{0.25}(RuO_2)_{0.5}$ | 50 | 20 | +310 | <−35 |
| $Ag_{0.25}Pt_{0.25}(RuO_2)_{0.5}$ | 40 | 100 | +280 | <−35 |
| $Ag_{0.66}(IrO_2)_{.01}(RuO_2)_{.33}$ | 50 | 130 | +135 | −23 |

An important feature of the compositions of the present invention is that the TCR is a function of resistivity, and not of $x$ and $y$. This is shown in FIG. 6, which is a plot of the TCR over the range 10 to 1M $\Omega/\square$, for three values of $x-y$. The important feature of this illustration is that resistivity can be varied from about 500 to 50K $\Omega/\square$ within the relatively narrow TCR range of ±150 p.p.m./° C.

It is known in the art that very small quantities of very high resistance compounds having highly negative TCR's can be employed with benefit. For example, $MnO_2$, CuO, CoO, NiO, etc. have TCR's in the −9000 to −10,000 p.p.m./° C. range (accounting for their use in thermistors). Even in small amounts, they also affect resistivity. While it is possible to make such additions to the compositions of the present invention, TCR's within ±500 p.p.m./° C. can be maintained over resistivities ranging from 10 to 900K $\Omega/\square$ over the range 25–125° C. without any such additions.

Figure 7:
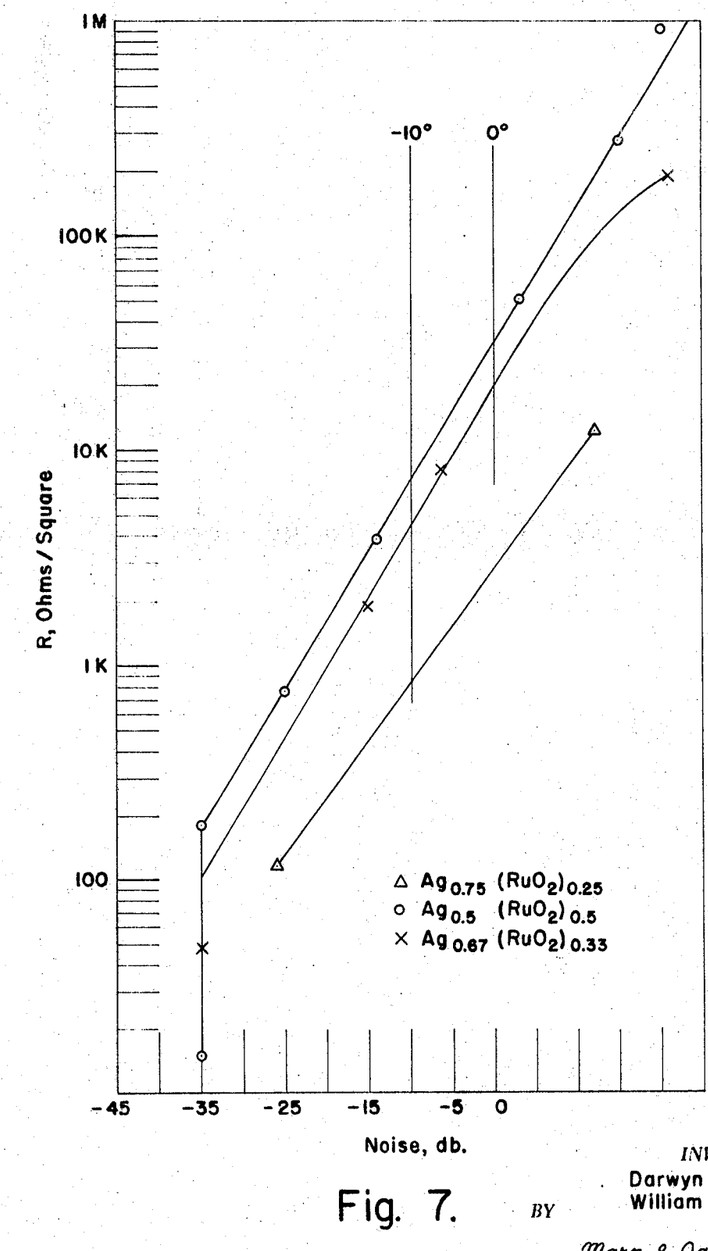
FIG. 7 is a plot of resistivity vs. noise for three levels of silver to ruthenium oxide content.

While data on noise is lacking in most of the prior art patents, it is believed that resistors made in accordance with the present invention have substantially lower noise levels than those made from prior art compositions. This is explainable at least in part because of the lower percentage of frit in the present compositions required to achieve a given resistivity. Resistors were made in accordance with the instructions set forth hereinabove with $l=0.20$ in. and $w=0.01$ in., and film thickness at 0.6 mil, as before. Each of these parameters is known to affect noise at a given resistivity. Noise levels were measured for three $x$–$y$ values and results are shown in FIG. 7. This shows that noise varies directly with resistivity and with increasing values of $x$. The excellent noise levels of these devices must be the result of more uniform electron movement, caused by fewer interruptions in the conductive paths. The lack of bubbles, faults and conductive voids in the film obviously contributes to this.

Figure 8:
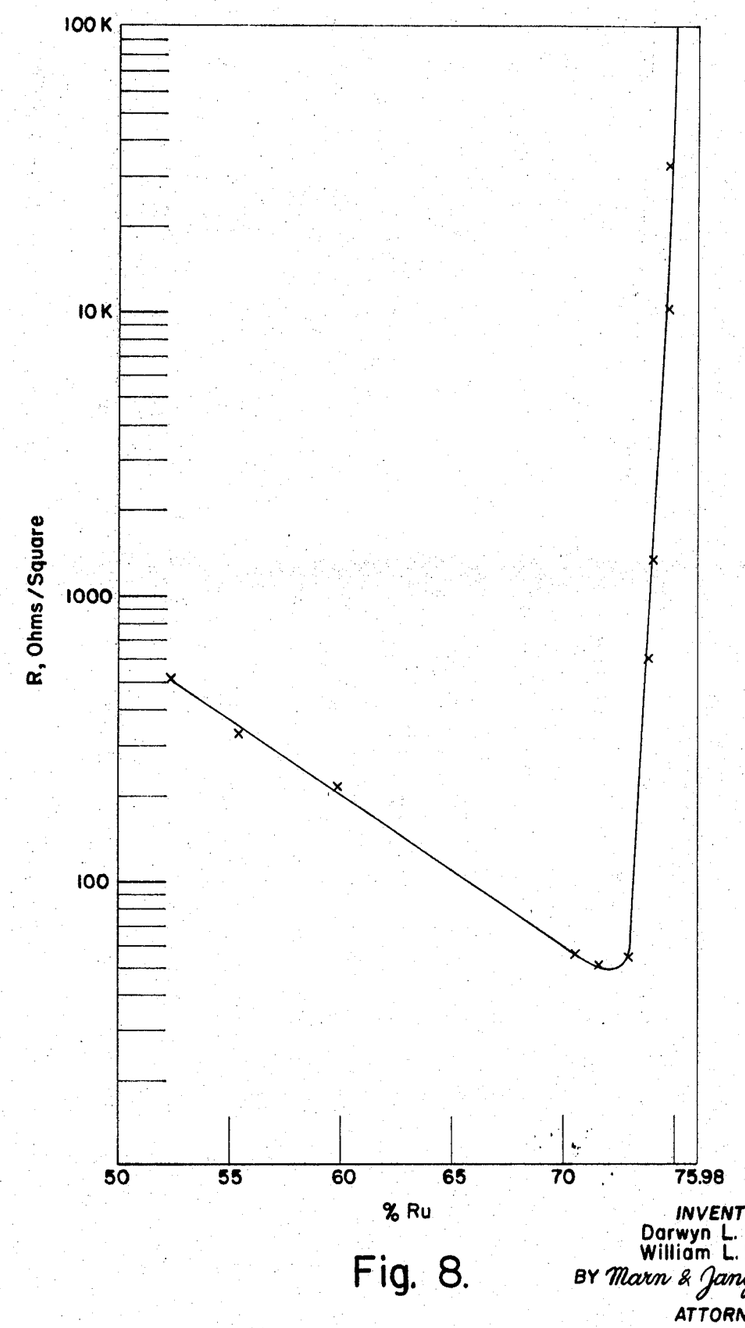
FIG. 8 is a plot of resistivity at one metal content vs. concentration of ruthenium in the oxide portion.

As noted above, it is preferred to use a ruthenium dioxide of the formula $RuO_2 \cdot zH_2O$ where $z$ falls in the range of about 0.1 to 3.5. This corresponds to a ruthenium content ranging from about 52%, to about 74%. A series of tests were made with $Ag_{0.5}(RuO_2 \cdot zH_2O)_{0.5}$ wherein the conductive fraction was 33.3% of the composition, and the value of $z$ was varied over this range. The results are shown in FIG. 8. This shows that resistance decreases with increasing ruthenium content, by about a single order of magnitude, in the range of 52 to 72.5% Ru ($z=3.5$ to 0.34). At this point a dramatic reversal occurs, and resistance rises quickly into the megohm range as the anhydrous state is approached. A test of pure $RuO_2$ (i.e. $z=0$) showed a resistivity greater than 100K megohms/. It will be appreciated that the application of such high resistances is limited, as for example to connect a high frequency input terminal to ground, or in shunt with a capacitor to remove the D.C. component of a signal. Thus, the useful value of $z$ is considered to be from 0 to 3.5.

It is not known why the degree of hydration affects resistivity in this manner, but it is clear that two mechanisms are at work, one in the range 52–72.5% and another in the 72.5–75.98% Ru range. It is also clear that, by controlling the degree of hydration, higher resistivities can be obtained at higher metal concentrations than was heretofore considered possible. Further, by varying resistance in this manner, the TCR change is lessened. With a 1M $\Omega$/ composition the TCR was −200 p.p.m./° C. as compared to −500 p.p.m./° C. for a composition of similar resistance made by varying the percent of metal.

It is to be noted that in other reported tests the ruthenium content was 72.98%.

In summary, compositions and a method have been determined which yield cermet resistors of excellent and predictable quality and which can produce resistivities orders of magnitude higher than what is shown by the art. The individual ingredients of the conductive fraction of the compositions have been used individually or in other combinations by prior workers although none have specified the partially hydrated form of ruthenium dioxide. Exactly what is responsible for the improved results achieved by the invention is not clear. To a first approximation, it would appear that a system of surprising thermodynamic stability, wherein glass-conductive interactions are minimized, has been achieved.

It is to be understood that various changes in the details, steps, materials, and conditions, which have been herein described and illustrated in order to explain the nature of the invention, may be made by those skilled in the art within the scope and principle of the invention as defined in the appended claims and their equivalents.

What is claimed is:

1. A resistance material for use in a fired resistor on a dielectric substrate or the like comprising an intimate blend of:
   from 20 to 70 percent by weight of a mixture of finely divided powders which is defined by the general formula:

$$M_x + O_y$$

where M is a metal selected from the group consisting of silver, gold, platinum and mixtures thereof, O is hydrated ruthenium oxide, and $x$ and $y$ are fractional numbers totaling unity defining the weight ratio between M and O and which fall within the range of about 0.20 to about 0.80; and
   from 30 to no more than 80 percent by weight of a finely divided glass frit said frit containing up to 30 percent by weight of non-glass forming metal oxide selected from the group consisting of oxides of metals in Group 3b and 4b of the Periodic Table.

2. The resistance material as claimed in claim 1, wherein O is hydrated ruthenium oxide having the formula $RuO_2 \cdot zH_2O$, where $z$ is in the range of 0.1 to 3.5.

3. The resistance material as claimed in claim 1, wherein the frit content is greater than about 40 percent by weight, and contains at least 10 percent by weight of said non-glass forming metal oxide.

4. The resistance material as claimed in claim 1, wherein the particle size of all ingredients of said blend is minus 5 microns.

5. A composition adapted to be fired on a dielectric substrate to form an electrical resistance element comprising an intimate blend of:
   from 20 to 70 percent by weight of a mixture of minus 5 microns powders which is defined by the formula:

$$M_x + O_y$$

where M is a metal selected from the group consisting of silver, gold, platinum and mixtures thereof, O is hydrated ruthenium oxide, and $x$ and $y$ are fractional numbers totaling unity defining the weight ratio between M and O, the value of $x$ being about 0.5 to 0.75 and the value of $y$ being about 0.5 to 0.25; and
   from 30 to no more than 80 percent by weight of a minus 5 micron lead borosilicate glass frit, said frit containing from 10 to 20 percent by weight of a member selected from the group consisting of $ZrO_2$, $HfO_2$, $TiO_2$ and $La_2O_3$.

6. The composition as claimed in claim 5 wherein M is silver, and O is hydrated ruthenium oxide having the formula $RuO_2 \cdot zH_2O$, where $z$ is in the range of 0.1 to 3.5.

7. A composition adapted to be fired on a dielectric substrate to form an electrical resistance element comprising:
   an intimate blend of minus 5 micron powders of silver, ruthenium dioxide and a lead borosilicate glass frit;
   said silver and ruthenium dioxide together comprising from 20 to 70 weight percent of said blend, and the weight ratio between said silver and ruthenium dioxide being between about 1:1 and about 4:1;
   said ruthenium dioxide being in a hydrated form analyzing between 52 and 74 percent ruthenium; and
   said frit comprising from 30 to no more than 80 weight percent of said blend and containing from 10 to 20 weight percent of a non-glass forming oxide selected from the group consisting of $ZrO_2$, $TiO_2$, $HfO_2$ and $La_2O_3$.

8. The composition as claimed in claim 7, and additionally comprising an inert liquid carrier in sufficient amount to form a screenable paste.

9. An electrical film resistor fired on the surface of a dielectric substrate comprising:
   a conductive fraction dispersed in a glass matrix; said conductive fraction consisting essentially of: a mixture of metals and oxides defined by the general formula:

$$M_x + O_y$$

where M is a metal selected from the group consisting of silver, gold, platinum and mixtures thereof, O is hydrated ruthenium oxide, and $x$ and $y$ are fractional numbers totaling unity varying between 0.25 and 0.75 and defining the weight ratio between M and O; and
   said conductive fraction comprising from 20 to 70 percent by weight of said resistor.

10. The film resistor as claimed in claim 9, wherein said glass matrix contains from 10 to 20 weight percent of an oxide selected from the group consisting of $ZrO_2$, $TiO_2$, $HfO_2$ and $La_2O_3$.

11. The method of making an electrical film resistor comprising:
forming an intimate blend of a minus 5 micron lead borosilicate glass frit containing a non-glass forming metal oxide and a conductive fraction;
said conductive fraction consisting essentially of minus 5 micron powders defined by the general formula:

$$M_x + O_y$$

where M is a metal selected from the group consisting of silver, gold, platinum and mixtures thereof, O is hydrated ruthenium oxide, and $x$ and $y$ are fractional numbers totaling unity and defining the weight ratio between M and O, and which fall within the range of about 0.20 to about 0.80;
said conductive fraction comprising about 20 to 70 weight percent of said blend;
said non-glass forming metal oxide comprising about 5 to 25 weight percent of said frit and being selected from the group consisting of $ZrO_2$, $HfO_2$, $TiO_2$ and $La_2O_3$;
mixing said blend with an inert liquid carrier to form a paste;
milling said paste to insure a minus 5 micron particle size of all solids and any agglomerates formed during said mixing step;
applying said paste to a substrate in desired dimensions; and
drying and firing said paste and said substrate to form a glass matrix bonded to said substrate with said conductive fraction and said non-glass forming oxide forming an evenly dispersed part thereof.

12. The method of claim 11, wherein O is hydrated ruthenium oxide having the formula $RuO_2 \cdot zH_2O$, where $z$ is in the range of 0.1 to 3.5.

13. The resistance material as claimed in claim 1, and additionally comprising an inert liquid carrier in sufficient amount to form a paste.

14. The composition as claimed in claim 5, and additionally comprising an inert liquid carrier in sufficient amount to form a screenable paste.

15. A composition adapted to be fired on a dielectric substrate to form an electrical film resistance element comprising:
an intimate blend of minus 5 micron powders of silver, hydrated ruthenium dioxide and a lead borosilicate glass frit in an inert liquid carrier;
said silver and hydrated ruthenium dioxide together comprising from 20 to 70 weight percent of said blend, and the weight ratio between said silver and hydrated ruthenium dioxide being between about 1:1 and about 4:1;
said hydrated ruthenium dioxide having the formula $RuO_2 \cdot zH_2O$, where $z$ is in the range of 0.1 to 3.5; and
said frit comprising from 30 to no more than 80 weight percent of said blend, and containing from 10 to 20 weight percent of a non-glass forming oxide selected from the group consisting of oxides of metals in Group 3$b$ and 4$b$ of the Periodic Table.

16. The resistor as claimed in claim 9, wherein O is hydrated ruthenium dioxide having the formula $RuO_2 \cdot zH_2O$, where $z$ is in the range of 0.1 to 3.5.

17. The method making an electrical resistor composition comprising:
forming an intimate blend of a minus 5 micron lead borosilicate glass frit containing a non-glass forming metal oxide and a conductive fraction;
said conductive fraction consisting essentially of minus 5 micron powders defined by the general formula:

$$M_x + O_y$$

where M is a metal selected from the group consisting of silver, gold, platinum and mixtures thereof, O is hydrated ruthenium oxide, and $x$ and $y$ are fractional numbers totaling unity and defining the weight ratio between M and O, and which fall within the range of about 0.20 to about 0.80,
said conductive fraction comprising about 20 to 70 weight percent of said blend;
said non-glass forming metal oxide comprising about 5 to 25 weight percent of said frit and being selected from the group consisting of $ZrO_2$, $HfO_2$, $TiO_2$ and $La_2O_3$,
mixing said blend with an inert liquid carrier to form a paste; and
milling said paste to insure a minus 5 micron particle size of all solids and any agglomerates formed during said mixing step.

References Cited

UNITED STATES PATENTS

| | | | |
|---|---|---|---|
| 3,324,049 | 6/1967 | Holmes | 252—518 |
| 3,352,797 | 11/1967 | Kim | 252—514 |
| 3,450,545 | 6/1969 | Ballard | 252—514 |
| 3,326,720 | 6/1967 | Bruhl et al. | 252—514 |
| 3,343,985 | 9/1967 | Vickery | 252—514 |

FOREIGN PATENTS

| | | | |
|---|---|---|---|
| 751,320 | 1/1967 | Canada | 252—514 |

DOUGLAS J. DRUMMOND, Primary Examiner

U.S. Cl. X.R.

117—227; 252—518